United States Patent [19]

Hirota et al.

[11] Patent Number: 4,639,805
[45] Date of Patent: Jan. 27, 1987

[54] COMBINATION OF REPRODUCING HEADS AND A ROTARY TRANSFORMER DEVICE

[75] Inventors: Akira Hirota, Chigasaki; Masahiko Tsuruta, Yokohama, both of Japan

[73] Assignee: Victor Company of Japan, Ltd., Japan

[21] Appl. No.: 554,457

[22] Filed: Nov. 22, 1983

[30] Foreign Application Priority Data

Nov. 25, 1982 [JP] Japan .......................... 57-178265[U]

[51] Int. Cl.[4] ................................................ G11B 5/52
[52] U.S. Cl. .................................... 360/108; 360/64; 360/84; 360/21
[58] Field of Search ....................... 360/64, 84, 108, 21

[56] References Cited

U.S. PATENT DOCUMENTS

| | | | |
|---|---|---|---|
| 4,031,558 | 6/1977 | Kusaka | 360/108 |
| 4,178,606 | 12/1979 | Hirota | 358/328 |
| 4,358,799 | 11/1982 | deNiet | 360/84 |
| 4,364,098 | 12/1982 | Hirota | 360/108 |
| 4,497,004 | 1/1985 | Shibata | 360/108 |
| 4,517,615 | 5/1985 | Hino | 360/108 |

FOREIGN PATENT DOCUMENTS

| | | | |
|---|---|---|---|
| 2225808 | 11/1974 | France . | |
| 1321940 | 7/1973 | United Kingdom . | |
| 2037476 | 7/1980 | United Kingdom | 360/108 |
| 532893 | 3/1977 | U.S.S.R. | 360/108 |
| 731462 | 4/1980 | U.S.S.R. | 360/108 |

OTHER PUBLICATIONS

Patents Abstracts of Japan, vol. 6, No. 111 (E-114) [989], Jun. 22, 1982; & JP-A-57 40 906.

Soviet Inventions Illustrated, Section EL, Week E37, Oct. 27, 1982; & SU-A-881-838.

Primary Examiner—Alan Faber
Attorney, Agent, or Firm—Andrus, Sceales, Starke & Sawall

[57] ABSTRACT

A rotary transformer is employed in a 4-head type recording and/or reproducing apparatus which has a rotary body which is wrapped with a magnetic tape, and four heads mounted 90° apart from each other on the rotary body for recording and/or reproducing a video signal onto and/or from the tape. The rotary transformer device comprises a rotary core which has five circular grooves formed in one surface thereof and is rotated unitarily with the rotary body, a first short-circuiting ring embedded in a center groove among the five grooves of the rotary body, first through fourth ring-shaped coils embedded in the remaining four grooves of the rotary body, a stationary core which is stationary at a location separated from and opposing the rotary core and has five circular grooves, a second short-circuiting ring embedded in a center groove among the five grooves of the stationary core, and fifth through eighth ring-shaped coils embedded in the remaining four grooves of the stationary core. The first and second ring-shaped coils which are located on one side with respect to the first short-circuiting ring, are coupled to one pair of mutually opposing heads among the four heads. The third and fourth ring-shaped coils which are located on a side opposite from the one side with respect to the first short-circuiting ring, are coupled to the other pair of mutually opposing heads.

6 Claims, 12 Drawing Figures

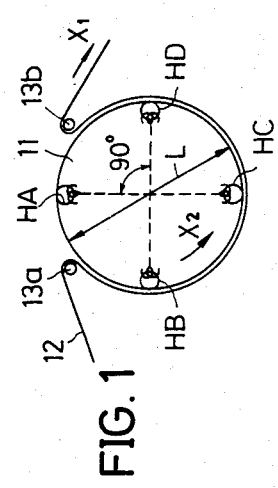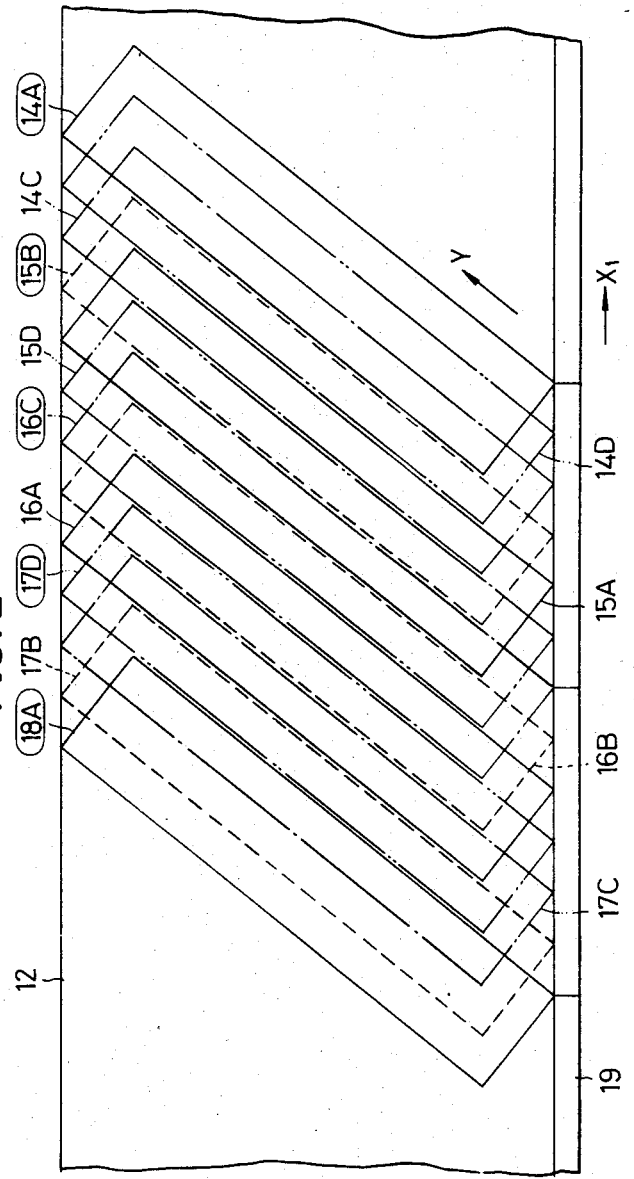

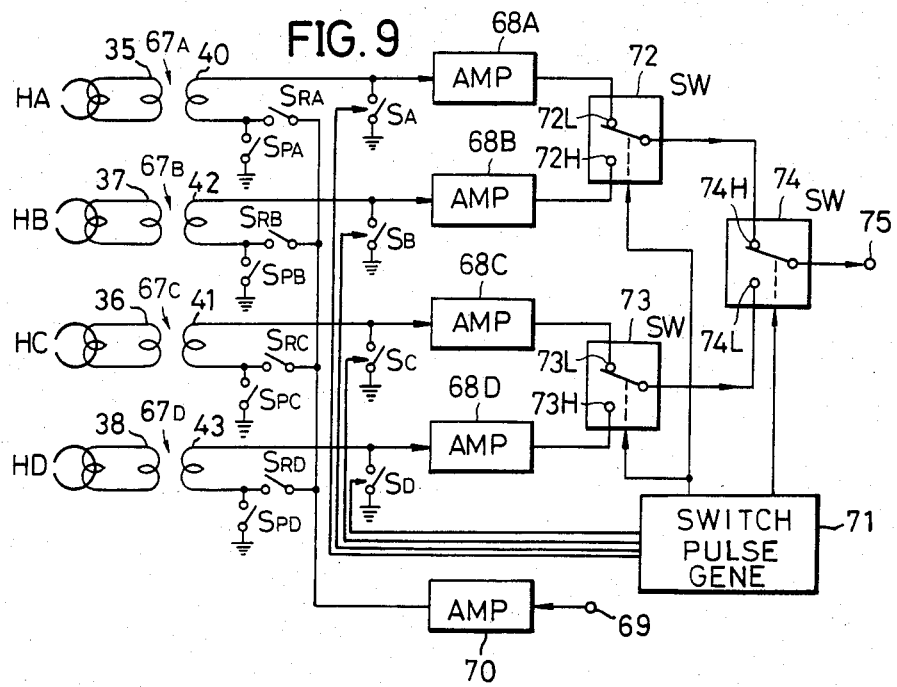
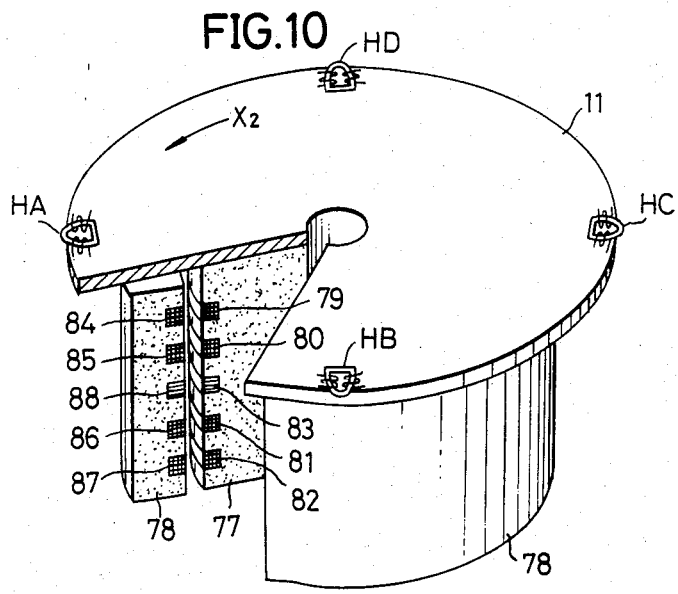

COMBINATION OF REPRODUCING HEADS AND A ROTARY TRANSFORMER DEVICE

BACKGROUND OF THE INVENTION

The present invention generally relates to rotary transformer devices for 4-head type recording and/or reproducing apparatuses which carry out recording and/or reproduction by use of four rotary video heads, and more particularly to a rotary transformer device which performs transmission and reception of signals between the four rotary video heads and a recording and/or reproducing circuit.

Generally, an existing helical scan type recording and/or reproducing apparatus (VTR) records a video signal by rotary heads onto tracks which are formed obliquely to the longitudinal direction of a magnetic tape upon recording, and reproduces the recorded signal from the tape upon reproduction. Among this type of a helical scan type VTR, there is a known 4-head type VTR in which four rotary video heads are equally spaced apart and mounted on a rotary body such as a rotary drum and a rotary plate, so that adjacent rotary video heads are spaced apart by 90°. In this 4-head type VTR, two mutually opposing rotary video heads have gaps of the same azimuth angle. In addition, the adjacent rotary video heads have gaps of mutually different azimuth angles. Certain conditions must be satisfied in order to form a tape pattern on the tape by the 4-head type VTR, so that the tape pattern is identical to a tape pattern which is formed on the tape by the existing VTR (hereinafter referred to as a 2-head type VTR) which carries out the recording and reproduction by use of two rotary video heads which are mounted diametrically on a rotary body. One condition which must be satisfied, is to select the azimuth angles of the gaps in the four rotary video heads to the same azimuth angles as the gaps in the two rotary video heads of the 2-head type VTR. Another condition to be satisfied, is to wrap the tape around the peripheral surface of the rotary body over an angular range of approximately 270°. Still another condition which must be satisfied, is to select the tape traveling speed so that the tape travels by one track pitch during one field period in which one rotary video head rotates by 270°.

If the above conditions are satisfied, the length of the tape which is in contact with the peripheral surface of the rotary body in the 4-head type VTR, becomes equal to the length of the tape which is in contact with the peripheral surface of the rotary body in the 2-head type VTR. In addition, the relative linear speed between the tape and the rotary video head in the 4-head type VTR becomes equal to the relative linear speed in the 2-head type VTR. As a result, one field of the video signal is successively recorded on one video track by the four rotary video heads, and it becomes possible to form a tape pattern on the tape which is completely the same as the tape pattern formed by the 2-head type VTR. Therefore, a compatible tape pattern is formed so that perfect compatibility can be ensured between the 2-head type VTR and the 4-head type VTR.

When supplying the recording video signal to each of the four video heads and when supplying the video signals which are reproduced from the four video heads to a reproducing circuit in the 4-head type VTR, the transmission and reception of signals are performed through rotary transformers which are provided exclusively for the four video heads. Thus, a total of four rotary transformers are required. The four rotary transformers are made up from a stationary core and a rotary core which are mutually separated, four ring-shaped coils which are embeddedly provided in the stationary core, and four ring-shaped coils which are embeddedly provided in the rotary core so as to oppose the four ring-shaped coils in the stationary core. However, the diameter of the rotary body which is mounted with the four video heads in the 4-head type VTR, is smaller than the diameter of the rotary body which is mounted with the two video heads in the 2-head type VTR. Thus, the diameters of the stationary core and the rotary core which constitute a common part of the four rotary transformers, respectively become smaller than the diameter of the rotary body which is mounted with the four video heads. Moreover, four ring-shaped coils had to be provided in both the stationary core and the rotary core which have these small diameters. Consequently, the adjacent ring-shaped coils had to be arranged exceedingly close to each other.

In addition, a total of three video heads including one video head which is actually carrying out the recording or reproduction, simultaneously scan over the tape in the 4-head type VTR. Hence, reproduced signals from three video heads are simultaneously obtained through three rotary transformers during the reproducing mode of the 4-head type VTR. However, because the ring-shaped coils which constitute the four rotary transformers are arranged exceedingly close to each other as described above, there was a problem in that the reproduced signals from the two video heads which simultaneously scan over the tape together with the one video head which is actually carrying out the reproduction, may mix into the reproduced signal from the one video head as crosstalk in the rotary transformer which transmits this reproduced signal from the one video head.

SUMMARY OF THE INVENTION

Accordingly, it is a general object of the present invention to provide a novel and useful rotary transformer device for a 4-head type recording and/or reproducing apparatus, in which the above described problems have been eliminated.

Another and more specific object of the present invention is to provide a rotary transformer device comprising a rotary core which has four ring-shaped coils and a first short-circuiting ring on one surface thereof, and a stationary core which is arranged with a slight gap from the one surface of the rotary core and has four ring-shaped coils and a second short-circuiting ring which respectively oppose the four ring-shaped coils and the first short-circuiting ring of the rotary core. The rotary core rotates unitarily with a rotary body which is mounted with four heads which are equally spaced apart so that adjacent heads are spaced apart by 90°. A magnetic tape onto which a video signal is recorded and from which the recorded video signal is reproduced, is wrapped around the peripheral surface of the rotary body over an angular range which is greater than 270° and less than 360°, and the rotary body rotates at a rotational speed such that the rotary body undergoes a 270°-rotation during a period which corresponds to 1/n times one field period of the video signal which is recorded and reproduced, where n is a natural number. The first short-circuiting ring is arranged so that first and second ring-shaped coils of the rotary core are located on one side of the first short-circuiting ring, and so that third and fourth ring-shaped coils of the rotary core are located on the other side of the first short-circuiting ring. One end of both the first and second ring-shaped coils are respectively coupled to a pair of mutually opposing heads among the four heads. On the other hand, one end of both the third and fourth ring-shaped coils are respectively coupled to the other pair of mutually opposing heads. According to the device of the present invention, it is possible to prevent reproduced signals from two heads which are mounted 90° apart from one head which is to actually provide a reproduced signal, from mixing into the reproduced signal from the one head as crosstalk within one rotary transformer which transmits the reproduced signal from the one head. The above problem of crosstalk is more likely to occur in the 4-head helical scan type recording and/or reproducing apparatus because the diameter of the rotary body is smaller than the diameter of the rotary body in the 2-head helical scan type recording and/or reproducing apparatus, however, the device according to the present invention effectively prevents such mixing of crosstalk into the reproduced signal even in the case of the 4-head type recording and/or reproducing apparatus.

Other objects and further features of the present invention will be apparent from the following detailed description when read in conjunction with the accompanying drawings.

BRIEF DESCRIPTION OF THE DRAWINGS

FIG. 1 shows an example of an arrangement of heads in a 4-head helical scan type recording and/or reproducing apparatus which is applied with a rotary transformer device according to the present invention;

FIG. 2 shows a tape pattern on a tape, illustrating scanning loci of the heads shown in FIG. 1;

FIG. 9 is a systematic block diagram showing an example of a signal recording and/or reproducing system in a recording and/or reproducing apparatus which comprises the rotary transformer device according to the present invention; and FIG. 10 is a perspective view, with a part cut away, showing a general construction of another embodiment of a rotary transformer device according to the present invention.

DETAILED DESCRIPTION

Figure 3:
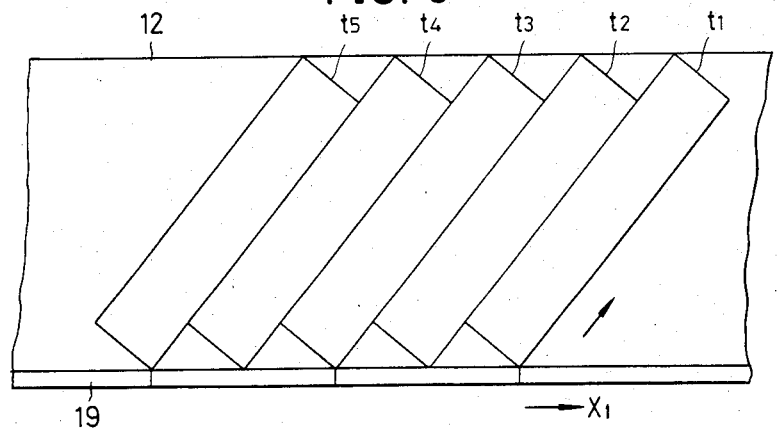
FIG. 3 shows a tape pattern in which the tracks are formed by the heads shown in FIG. 1.

First, description will be given with respect to the arrangement of heads, the angular range over which a magnetic tape is wrapped around a rotary body, the scanning loci of the heads, and the like, in a 4-head type recording and/or reproducing apparatus (VTR) which comprises a rotary transformer device according to the present invention. In FIG. 1, a rotary body 11 which may assume the form of a rotary drum or a rotary plate, for example, has a diameter L. This diameter L of the rotary drum 11, is selected to $\frac{2}{3}$ the diameter of the rotary drum in the existing 2-head helical scan type VTR. The rotary body 11 is rotated counterclockwise (the direction indicated by an arrow $X_2$) at a rotational speed (45 rps, for example) which is related to the field frequency of the video signal which is to be recorded and reproduced, by a motor (not shown). Recording and reproducing magnetic heads (video heads) HA, HB, HC, and HD are equally spaced apart and mounted on the rotary body 11, so that adjacent video heads are spaced apart by 90°. The video heads HA and HC have gaps of the same azimuth angle, and the video heads HB and HD have gaps of the same azimuth angle. The video heads HA and HB have gaps of mutually different azimuth angles.

When carrying out a so-called interchanged reproduction in which a tape recorded by one 4-head type VTR is reproduced by a different 4-head type VTR, a part of the reproduced signal may become dropped out or a part of the reproduced signal may overlap, due to a deviation in the switching point of the video heads between the two 4-head type VTRs. The dropout of a part of the reproduced signal or overlap of a part of the reproduced signal, may be prevented from occurring by wrapping the tape around the rotary body 11 over an angular range which is slightly larger than 270°, and by constantly applying the recording current to two video heads which actually carry out the recording recorded immediately before one video head completes recording one track, is simultaneously recorded on a starting part of a subsequent track by another video head. This measure is the so-called overlap recording.

By taking into account the angle required to carry out the above overlap recording, a magnetic tape 12 is guided by guide poles 13a and 13b and wrapped obliquely around the peripheral surface of the rotary body 11 over an angular range which is greater than 270° and less than 360°. This angular range over which the tape 12 is wrapped around the peripheral surface of the rotary body 11, is selected so as not to interfere with the tape travel, and so that the tape 12 can be loaded automatically. The diameter L of the rotary drum 11 is equal to $\frac{2}{3}$ the diameter of the rotary body in the existing 2-head type VTR, and is small. The tape 12 is driven in a state where the tape 12 is pinched between a capstan (not shown) and a pinch roller (not shown), to travel in the direction of an arrow $X_1$. The traveling speed of the tape 12 is selected so that the tape 12 travels by one track pitch while one of the video heads HA, HB, HC, and HD rotates by an angle which is slightly larger than 270° at a rotational speed of 45 rps.

Accordingly, the length of the tape 12 which is in contact with the peripheral surface of the rotary body 11, is equal to the length of the tape which is in contact with the peripheral surface of the rotary body in the existing 2-head type VTR. As a result, the loci of video tracks which are formed on the tape 12, is identical to the loci of the video tracks which are formed in the existing 2-head type VTR. In addition, the relative linear speed between the tape and the head, is identical to the relative linear speed obtained in the existing 2-head type VTR. A video signal having a field frequency of 60 Hz (or 59.94 Hz) is successively recorded at a rate of one field in one track, as will be described later on in the specification, and the resulting tape pattern on the tape 12 is identical to the tape pattern which is obtained in the existing 2-head type VTR so as to ensure perfect tape compatibility between the 4-head type VTR which is applied with the system according to the present invention and the existing 2-head type VTR.

When recording or reproducing a video signal having a field frequency of 50 Hz at a rate of one field in one track, it is obvious that the rotary body 11 is rotated at a rotational speed of 37.5 rps.

The scanning loci of the four video heads HA, HB, HC, and HD in the 4-head type VTR described heretofore, are shown in FIG. 2. As clearly seen from FIG. 2, the scanning loci of the four video heads HA, HB, HC, and HD are different from the scanning loci of the two video heads in the existing 2-head type VTR. If the video head HA assumes a location near the guide pole 13a and starts to scan over the tape 12, a scanning locus indicated by a solid line 14A in FIG. 2 begins to be formed. When the video head HA scans over approximately ⅓ the scanning locus 14A, the video head HD which lags the video head HA by 90° with respect to the rotating direction of the rotary body 11 starts to make contact with the tape 12. Further, when the video head HA scans over ⅔ the scanning locus 14A, the video head HC starts to make contact with the tape 12. At a point when the video head HA completes scanning over the scanning locus 14A, the video head HB starts to make contact with the tape 12. Accordingly, as the video head HA scans over the scanning locus 14A, the video head HD scans over a scanning locus indicated by a two-dot chain line 14D in FIG. 2 with a predetermined time lag, and the video head HC scans over a scanning locus indicated by a one-dot chain line 14C in FIG. 2 with a further predetermined time lag. The video head HB starts to scan over a scanning locus indicated by a broken line 15B at the point when the video head HA completes scanning over the scanning locus 14A.

Similarly thereafter, scanning loci 15A, 15D, 16C, 16B, 16A, 17D, 17C, 17B, 18A, . . . are successively formed in this sequence by the heads HA, HB, HC, and HD. In FIG. 2, the track width of each of the tracks are illustrated as being equal to the track pitch, for convenience' sake. In addition, a control track 19 is formed along the longitudinal direction of the tape 12. For example, a control pulse is recorded on this control track 19 with a period which is equal to two fields.

In order to form a tape pattern which is identical to the tape pattern shown in FIG. 3 which is formed by the existing 2-head type VTR, the video signal is only supplied to the video heads which are scanning over the scanning loci 14A, 15B, 16C, 17D, 18A, . . . . The reference numerals of these scanning loci 14A, 15B, 16C, 17D, 18A, . . . are encircled in FIG. 2. As a result, a track $t_1$ shown in FIG. 3 is formed by the head HA. Similarly, by switching the recording head in a sequence HB→HC→HD→HA→ . . . for every period which is approximately equal to one field, video tracks $t_2, t_3, t_4, t_5, \ldots$ are formed in this sequence.

Hence, during the recording mode of the 4-head type VTR, the video signal must be successively switched and supplied to one of the four heads HA, HB, HC, and HD. Further, during the reproducing mode of the 4-head type VTR, the reproduced signals from the heads HA, HB, HC, and HD must successively be switched so as to obtain only one reproduced signal from one of the heads HA, HB, HC, and HD at one time.

However, even if the above switching of the reproduced signals is performed during the reproducing mode, the reproduced signals from two heads which simultaneously scan over the tape 12 together with one head from which the reproduced signal must actually be obtained, may mix into the reproduced signal from the one head as crosstalk in a rotary transformer which transmits this reproduced signal from the one head. In other words, when the head HB scans over the scanning locus 15B shown in FIG. 2 so as to reproduce the signal from the track $t_2$ shown in FIG. 3, for example, the head HC scans over the scanning locus 14C with a phase which leads the head HB by 120°, the head HA scans over the scanning locus 15A with a phase which lags the head HB by 120°, and the head HD scans over the scanning locus 15D with a phase which lags the head HB by 240°. Hence, because the signal is recorded by the azimuth recording method, the heads HC and HA which have the gaps of the same azimuth angle which is different from the azimuth angle of the gap in the head HB which is reproducing the recorded signal from the track $t_2$, respectively scan over ⅓ the track width of the adjacent tracks $t_1$ and $t_3$ which are recorded with heads having gaps of the same azimuth angle as the gaps in the heads HC and HA, simultaneously as when the head HB scans over the track $t_2$ to reproduces the recorded signal. As a result, there was a problem in that the reproduced signals from the heads HC and HA may mix into the reproduced signal from the head HB as crosstalk, within the rotary transformer.

Accordingly, the rotary transformer device according to the present invention has eliminated the above problem of crosstalk by providing a short-circuiting ring at a central part between four ring-shaped coils.

Figure 4:
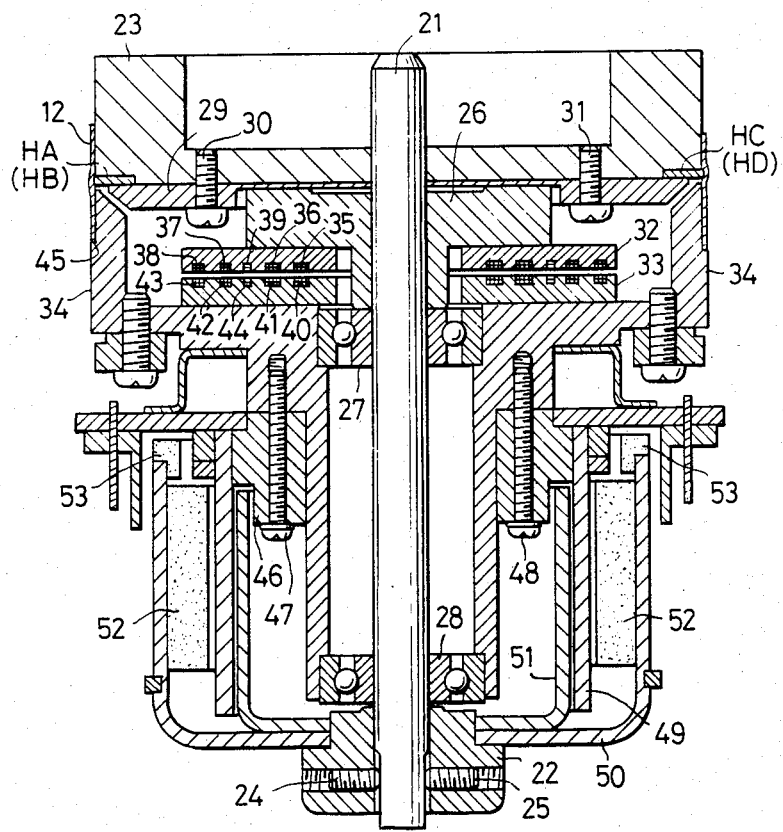
FIG. 4 is a side view in vertical cross section, showing an embodiment of a head rotating mechanism in a state where a rotary transformer device according to the present invention is mounted onto a rotary drum.

Next, description will be given with respect to an embodiment of a rotary transformer device according to the present invention, in conjunction with description related to a head rotating mechanism. In FIG. 4, one end of a motor shaft 21 penetrates through a central part of a stopper 22 which is arranged at a bottom part of a motor 20. The other end of the motor shaft 21 is inserted through a central part of a rotary upper drum 23 and fixed to this rotary upper drum 23. This rotary upper drum 23 is an example of the rotary body 11 described before. The stopper 22 is secured to the motor shaft 21 by set screws 24 and 25. A flywheel 26 is fixed to the motor shaft 21 at a central hole thereof, so that a top surface of the flywheel 26 makes contact with a bottom surface of the rotary upper drum 23. The motor shaft 21 is rotatably supported by a bearing 27 which is located below the flywheel 26, and by a bearing 28 which is located above the stopper 22.

A head mount 29 is secured on the bottom surface of the rotary upper drum 23 by set screws 30 and 31. The rotary video heads HA (or HB) and HC (or HD) are mounted at diametrical positions on the head mount 29. A disc-shaped rotary core 32 is fixedly mounted onto the flywheel 26. Further, a disc-shaped stationary core 33 is fixedly mounted onto a stationary lower drum 34, so that a top surface of the stationary core 33 opposes a bottom surface of the rotary core 32 with a slight gaps formed between the top surface of the stationary core 33 and the bottom surface of the rotary core 32. In the present embodiment of a rotary transformer device according to the present invention comprises the rotary core 32, the stationary core 33, ring-shaped coils 35, 36, 37, and 38 and a first short-circuiting ring 39 which are concentrically arranged on the bottom surface of the rotary core 32, and ring-shaped coils 40, 41, 42, and 43 and a second short-circuiting ring 44 which are concentrically arranged on the top surface of the stationary core 33, as will be described hereinafter.

The stationary lower drum 34 comprises therein a part of the motor shaft 21, the flywheel 26, the bearings 27 and 28, the head mount 29, the set screws 30 and 31, the rotary core 32, and the stationary core 33. A tape guiding groove 45 is spirally formed in the outer peripheral surface of the stationary lower drum 34. The magnetic side of the magnetic tape 12 makes contact with the outer peripheral surfaces of both the rotary upper drum 23 and the stationary lower drum 34, in a state where the lower edge of the tape 12 is guided by the tape guiding groove 45. As described before in conjunction with FIG. 1, the tape 12 is spirally wrapped around the outer peripheral surfaces of both the rotary upper drum 23 and the stationary lower drum 34, over an angular range which is greater than 270° and less than 360°.

A stator 46 which surrounds a lower part of the stationary lower drum 34, is secured to the stationary lower drum 34 by set screws 47 and 48. A hollow cylindrical coil 49 is fixedly mounted onto the stator 46. A first rotor 50 and a second rotor 51 respectively have a U-shaped cross section, and therefore has an opening at the upper part thereof. The first rotor 50 has a diameter which is larger than a diameter of the second rotor 51. An upper part of the stopper 22 fits into a center hole in the bottom of the first rotor 50 and also into a center hole in the bottom of the second rotor 51. These first and second rotors 50 and 51 are respectively fixed to the stopper 22. A hollow cylindrical magnet 52 is fixed onto the inner peripheral surface of the first rotor 50. The thickness and the like of the magnet 52 are selected so that the magnet 52 opposes the outer peripheral surface of the coil 49, with a slight gap formed between the inner peripheral surface of the magnet 52 and the outer peripheral surface of the coil 49. In addition, the magnet 52 is magnetized in the horizontal direction in FIG. 4. On the other hand, the outer diameter of the second rotor 51 is selected so that the second rotor 51 opposes the inner peripheral surface of the coil 49, with a slight gap formed between the outer peripheral surface of the second rotor 51 and the inner peripheral surface of the coil 49. A magnet 53 is provided in order to obtain a rotation detection signal which has a frequency in accordance with the rotational speed of the motor shaft 21 and the like.

When a current is applied to the coil 49 in the above motor rotating mechanism, the first and second rotors 50 and 51, the magnet 52, the motor shaft 21, and the stopper 22 respectively rotate unitarily at a rotational speed which is in accordance with the current applied to the coil 49. As a result, the rotary upper drum 23, the head mount 29, the rotary video heads HA, HB, HC, and HD, the flywheel 26, and the rotary core 32 respectively rotate unitarily. On the other hand, the stationary core 33, the stationary lower drum 34, the coil 49, and the like, constantly remain stationary.

Figure 5A:
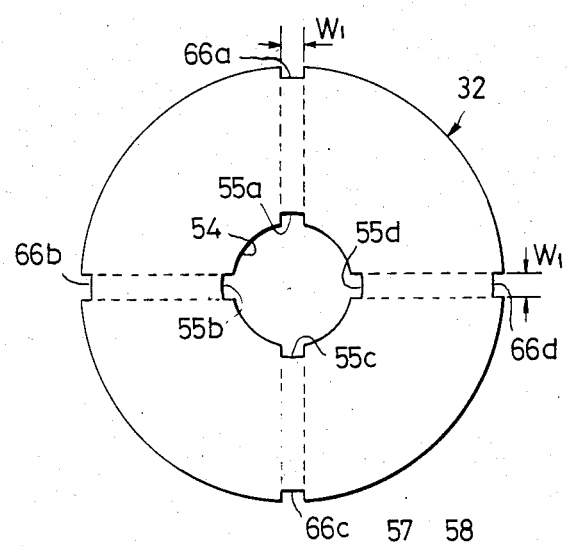
FIGS. 5A, 5B, and 5C are a plan view, a side view in vertical cross section, and a bottom view, respectively showing an embodiment of a rotary core in the rotary transformer device according to the present invention.
Figure 5B:
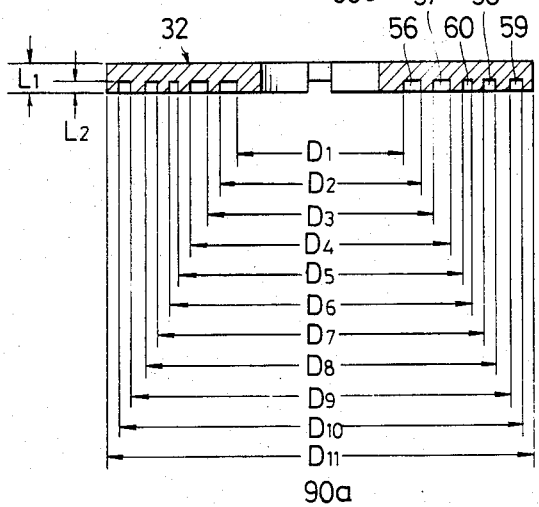
Figure 5C:
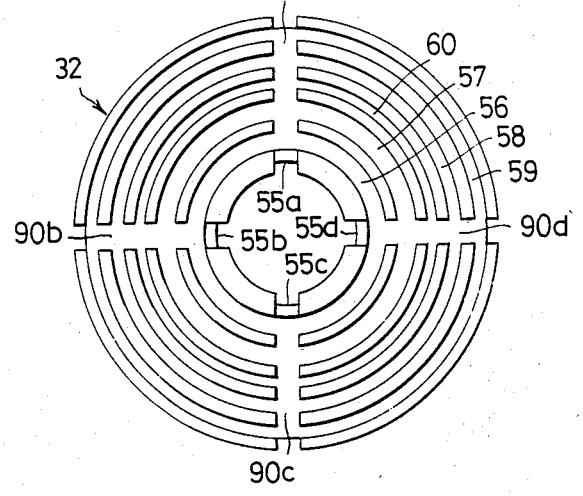

Next, more detailed description will be given with respect to the present embodiment of the rotary transformer device according to the present invention. FIG. 5A shows the top surface of the rotary core 32 which is made of ferrite, for example. A hole 54 which has a diameter in the range of 11 mm, for example, is formed in the central part of the rotary core 32. Cutouts 55a, 55b, 55c, and 55d are equally spaced apart by 90° and formed in the hole 54, so as to provide space for lead wires. A width $W_1$ of these cutouts 55a, 55b, 55c, and 55d are selected to a value in the range of 1.8 mm, for example. The rotary core 32 is a disc having a thickness $L_1$. As shown in FIGS. 5B and 5C which respectively are a side view in cross section and a bottom view of the rotary core 32, grooves 56, 57, 58, 59, and 60 which respectively have a U-shaped cross section and a depth $L_2$, are formed concentrically in the bottom surface of the rotary core 32. For example, the thickness $L_1$ is selected in the range of 2.2 mm, and the depth $L_2$ is selected in the range of 0.6 mm.

The groove 56 has an inner diameter $D_1$ and an outer diameter $D_2$, the groove 57 has an inner diameter $D_3$ and an outer diameter $D_4$, the groove 58 has an inner diameter $D_7$ and an outer diameter $D_8$, and the groove 59 has an inner diameter $D_9$ and an outer diameter $D_{10}$. The ring-shaped coils 35, 36, 37, and 38 shown in FIG. 4, are embedded in these grooves 56, 57, 58, and 59. One end of each of the ring-shaped coils 35, 36, 37, and 38, and the other end of each of these ring-shaped coils 35, 36, 37, and 38, are coupled to the rotary video heads HA, HB, HC, and HD through independent lead wires. In addition, the groove 60 has an inner diameter $D_5$ and an outer diameter $D_6$, and is located between the grooves 57 and 58. That is, the grooves 56 and 57 are located on the inner side of the groove 60, and the grooves 58 and 59 are located on the outer side of the groove 60. The first short-circuiting ring 39 shown in FIG. 4, is embedded in the groove 60. The first short-circuiting ring 39 and the second short-circuiting ring 44 which will be described later on in the specification, are respectively made of a conductive material such as a copper wire, for example. The first and second short-circuiting rings 39 and 44 respectively are continuous and have no ends because these short-circuiting rings 39 and 44 are not intended for signal transmission and reception. In other words, there are no connecting terminals in the short-circuiting rings 39 and 44 for providing connection between external circuit parts.

A diameter $D_{11}$ of the rotary core 32 is in the range of 37 mm, for example. Further, the diameters $D_1$, $D_2$, $D_3$, $D_4$, $D_5$, $D_6$, $D_7$, $D_8$, $D_9$, and $D_{10}$ are respectively selected to 15 mm, 18 mm, 20 mm, 23 mm, 25 mm, 26.5 mm, 28.5 mm, 30.5 mm, 33 mm, and 35 mm, for example. Accordingly, while the widths of the grooves 56 and 57 respectively are 3 mm, the widths of the grooves 58 and 59 respectively are 2 mm. This is because, when obtaining the same coupling coefficient with a unit length of winding, the winding numbers of the coils which are embedded in the grooves 56 and 57 becomes larger than the winding numbers of the coils which are embedded in the grooves 58 and 59. Moreover, the width of the groove 60 may be small, because the short-circuiting ring 39 which is embedded in the groove 60 is not intended for signal transmission and reception, but for preventing crosstalk. In the present embodiment, the width of the groove 60 is selected to 1.5 mm.

Figure 6:
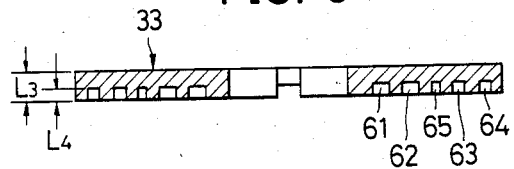
FIG. 6 is a side view in vertical cross section, showing an embodiment of a stationary core in the rotary transformer device according to the present invention.
Figure 7:
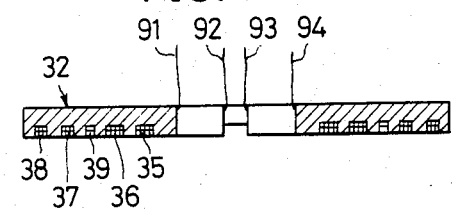
FIG. 7 is a view in cross section showing an example of a rotary core in a state where ring-shaped coils are mounted thereon in the rotary transformer device according to the present invention.

The stationary core 33 is a disc having a thickness $L_3$ as shown in FIG. 6 which is a vertical cross section of the stationary core 33. Grooves 61, 62, 63, 64, and 65 respectively having a U-shaped cross section and differing diameters, are concentrically formed in one surface of the stationary core 33. The grooves 61, 62, 63, 64, and 65 are respectively located at positions corresponding to the positions of the grooves 56, 57, 58, 59, and 60 which are formed in the rotary core 32. Corresponding grooves in the rotary core 32 and the stationary core 33, have the same width. Accordingly, the cross sectional shape of the stationary core 33 is identical to the cross sectional shape of the rotary core 32. For example, the thicknesses $L_3$ and $L_4$ are respectively selected to values approximately equal to 2.2 mm and 0.6 mm. As shown in FIG. 4, the ring-shaped coils 40, 41, 42, and 43 are respectively embedded in the two inner grooves 61 and 62 and the two outer grooves 63 and 64. The second short-circuiting ring 44 is embedded in the central groove 65.

In order to facilitate mass production, the shape of the stationary core 33 is identical to the shape of the rotary core 32. The stationary core 33 comprises cutouts corresponding to cutouts 66a through 66d of the rotary core 32 shown in FIG. 5A, five concentric grooves 61 through 65 corresponding to the grooves 56 through 60 of the rotary core 32 shown in FIG. 5C, and radial grooves corresponding to radial grooves 90a through 90d of the rotary core 32 which are spaced 90° apart from each other. Because the rotary core 32 is provided in a space within the rotary upper drum 23, output lead wires 91 through 94 of the ring-shaped coils 35 through 38 are respectively drawn out through the cutouts 55a through 55d which are formed in the inner periphery of the rotary core 32 as shown in FIG. 5A, and coupled to the heads HA through HD, by taking into account the degree of ease with which the wiring may be arranged.

Figure 8:
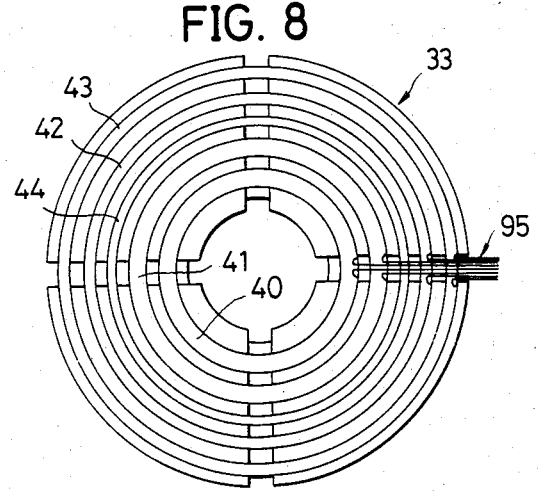
FIG. 8 is a bottom view showing an example of a stationary core in a state where ring-shaped coils are mounted thereon in the rotary transformer device according to the present invention.

On the other hand, lead wires of the ring-shaped coils 40 through 43 which are embedded in the stationary core 33, is coupled to a preamplifier and the like which are provided on an external base plate, through a hole which is formed in a part of the stationary lower drum 34 where the stationary lower drum 34 is not in contact with the tape 12. That is, as indicated by a reference numeral 95 in FIG. 8, the lead wires of the ring-shaped coils 40 through 43 are commonly passed through one of the four radial grooves which correspond to the radial grooves 90a through 90d of the rotary core 32 shown in FIG. 5C, and is then drawn out through one of the four cutouts which correspond to the cutouts 66a through 66d of the rotary core 32 shown in FIG. 5A. The lead wires of the ring-shaped coils 40 through 43 are drawn out through the cutout in the outer periphery of the stationary core 33 in order to facilitate the wiring, because the lead wires of the ring-shaped coils 40 through 43 are coupled to the preamplifier and the like which are provided at distant locations. Moreover, one of the four radial grooves is commonly used to pass the lead wires of the ring-shaped coils 40 through 43, because only a single hole is formed in the stationary lower drum 34.

Next, description will be given with respect to a signal recording and/or reproducing system in the VTR which comprises the rotary transformer device described heretofore. The ring-shaped coils 35 and 36 which are located on the inner side of the short-circuiting ring 39 shown in FIG. 4, are respectively coupled to the mutually opposing heads HA and HC. On the other hand, the ring-shaped coils 37 and 38 which are located on the outer side of the short-circuiting ring 39, are respectively coupled to the mutually opposing heads HB and HD. Further, in FIG. 9, one end of both the ring-shaped coils 40 and 41 which are located at positions opposing the ring-shaped coils 35 and 36, are respectively coupled to a connection point between opening and closing switches $S_{PA}$ and $S_{RA}$ and to a connection point between opening and closing switches $S_{PC}$ and $S_{RC}$. The other end of both the ring-shaped coils 40 and 41, are respectively coupled to input terminals of preamplifiers 68A and 68C. Similarly, one end of both the ring-shaped coils 42 and 43 which are located at positions opposing the ring-shaped coils 37 and 38, are respectively coupled to a connection point between opening and closing switches $S_{PB}$ and $S_{RB}$ and to a connection point between opening and closing switches $S_{PD}$ and $S_{RD}$. The other end of both the ring-shaped coils 42 and 43, are respectively coupled to input terminals of preamplifiers 68B and 68D.

In addition, the other ends of the ring-shaped coils 40 through 43, are respectively grounded through opening and closing switches $S_A$, $S_C$, $S_B$, and $S_D$. The opening and closing switches $S_{RA}$ through $S_{RD}$, $S_A$ through $S_D$, and $S_{PA}$ through $S_{PD}$ respectively are electronic switches. However, because the switches $S_{PA}$ through $S_{PD}$ are kept OFF during the recording mode and kept ON during the reproducing mode and need not be switched at a high speed, these switches $S_{PA}$ through $S_{PD}$ may be relay switches.

During the recording mode, the switches $S_{PA}$, $S_{PB}$, $S_{PC}$, and $S_{PD}$ are respectively turned OFF. On the other hand, the switches $S_A$, $S_B$, $S_C$, and $S_D$ are respectively turned ON to short-circuit the inputs of the preamplifiers 68A, 68B, 68C, and 68D to ground. An input video signal which is to be recorded, is applied to an input terminal 69. For example, this input video signal may be a signal in which a frequency modulated luminance signal and a frequency converted carrier chrominance signal are frequency-division-multiplexed, where the frequency modulated luminance signal is obtained by frequency-modulating a luminance signal which is separated from a standard color video signal, and the frequency converted carrier chrominance signal is obtained by frequency-converting a carrier chrominance signal which is separated from the standard color video signal into a band which is lower than the band of the frequency modulated luminance signal. The frequency converted carrier chrominance signal may be subjected to a phase shift as a countermeasure against crosstalk, as disclosed in a U.S. Pat. No. 4,178,606 in which the assignee is the same as the assignee of the present application.

The input video signal is passed through a recording amplifier 70, and applied to inputs of the switches $S_{RA}$, $S_{RB}$, $S_{RC}$, and $S_{RD}$. The switches $S_{RA}$, $S_{RB}$, $S_{RC}$, and $S_{RD}$ are made up from switching circuits which are controlled of their ON and OFF states by a switching signal. During the recording mode, the ON and OFF states of the switches $S_{RA}$ through $S_{RD}$ are independently controlled by four switching pulses which are generated from a switching pulse generating circuit 71. The switches $S_{RA}$ through $S_{RD}$ are successively turned ON for a period which is approximately equal to one field period. Accordingly, during a certain period which is approximately equal to one field period, the recording video signal from the recording amplifier 70 is passed through the switch $S_{RA}$ and the ring-shaped coils 40 and 35 of a rotary transformer 67A, and supplied to the head HA to be recorded on the tape 12. During a subsequent period which is approximately equal to one field period, the recording video signal from the recording amplifier 70 is passed through the switch $S_{RB}$ and the ring-shaped coils 42 and 37 of a rotary transformer 67B, and supplied to the head HB to be recorded on the tape 12. Similarly, during a subsequent period which is approximately equal to one field period, the recording video signal from the recording amplifier 70 is passed through the switch $S_{RC}$ and the ring-shaped coils 41 and 36 of a rotary transformer 67C, and supplied to the head HC to be recorded on the tape 12. Further, during a subsequent period which is approximately equal to one field period, the recording video signal from the recording amplifier 70 is passed through the switch $S_{RD}$ and the ring-shaped coils 43 and 38 of a rotary transformer 67D, and supplied to the head HD to be recorded on the tape 12.

The phases of the four switching pulses are set so that one of the heads HA through HD which is supplied with the video signal, scans over the tape 12. Hence, the video signal is successively recorded by the heads HA through HD on successive tracks. If it is assumed that the switch $S_{RA}$ is ON, this switch $S_{RA}$ and the switch $S_{RB}$ which is to be turned ON subsequently, are respectively controlled so that a predetermined period To at the end of the ON period of the switch $S_{RA}$ overlaps a predetermined period To at the beginning of the ON period of the switch $S_{RB}$. As a result, the video signal which is in the same section, is simultaneously recorded by the heads HA and HB on two independent tracks, during the predetermined period To. In other words, the so-called overlap recording described previously, is carried out.

Similarly, the ends of the tracks which correspond to the predetermined period To and are formed by the heads HB, HC, and HD, are recorded with the video signal of the same section as the beginnings of the tracks which correspond to the predetermined period To and are formed by the heads HC, HD, and HA. Hence, as shown in FIG. 3, the tape pattern which is formed by the 4-head type VTR becomes identical to the tape pattern which is formed by the existing 2-head type VTR, so that tape compatibility is ensured between the 2-head type VTR and the 4-head type VTR.

Next, description will be given with respect to the operation of the signal recording and/or reproducing system during the reproducing mode. During the reproducing mode, the switches $S_{RA}$ through $S_{RD}$ are respectively kept OFF. On the other hand, the switches $S_{PA}$ through $S_{PD}$ are respectively kept ON so as to ground one end of each of the ring-shaped coils 40, 42, 41, and 43. Further, the switching pulse generating circuit 71 generates four kinds of pulses which are formed from a rotational phase detection signal which is in synchronism with the rotational phase of the rotary upper drum 23. These four kinds of pulses have a period of four fields, and time-divisionally assume a low level, for example, for every one field period. The four kinds of pulses which are generated from the switching pulse generating circuit 71, are respectively supplied to the switches $S_A$ through $S_D$ to time-divisionally turn OFF these switches $S_A$ through $S_D$ for one field period.

During the reproducing mode, the reproduced signals from the heads HA through HD are successively switched so that the reproduced signal is obtained from the heads HA→HB→HC→HD→HA→ . . . in this sequence, for every one track scanning period. The reproduced signal from the head HA is transmitted to the ring-shaped coil 40, through the ring-shaped coil 35. The reproduced signal from the head HB is transmitted to the ring-shaped coil 42, through the ring-shaped coil 37. In addition, the reproduced signal from the head HC is transmitted to the ring-shaped coil 41, through the ring-shaped coil 36. Furthermore, the reproduced signal from the head HD is transmitted to the ring-shaped coil 43, through the ring-shaped coil 38.

Suppose that the head HB is reproducing the recorded signal from the track $t_2$ shown in FIG. 3. In this case, the heads HC and HA which have the gaps of the same azimuth angle which is different from the azimuth angle of the gap in the head HB, respectively scan over ⅓ the track width of the adjacent tracks $t_1$ and $t_3$ which are recorded with heads having gaps of the same azimuth angle as the gaps in the heads HC and HA, simultaneously as when the head HB scans over the track $t_2$. Of course, the head HC leads and the head HA lags the start of the reproduction by the head HB. The reproduced signals from the heads HA and HC are respectively transmitted between the ring-shaped coils 35 and 40 and the ring-shaped coils 36 and 41 which are located on the inner side of the short-circuiting rings 39 and 44. On the other hand, the signal which is reproduced from the track $t_2$ and obtained from the head HB, is transmitted between the ring-shaped coils 37 and 42 which are located on the outer side of the short-circuiting rings 39 and 44. Accordingly, the signal which is reproduced from the track $t_3$ by the head HA and transmitted from the ring-shaped coil 35 to the ring-shaped coil 40, and the signal which is reproduced from the track $t_1$ by the head HC and transmitted from the ring-shaped coil 36 to the ring-shaped coil 41, will not mix into the reproduced signal from the head HB as crosstalk. This is because the reproduced signal from the head HB is transmitted from the ring-shaped coil 37 to the ring-shaped coil 42, and the short-circuiting ring 39 exists between the ring-shaped coils 36 and 37 and the short-circuiting ring 44 exists between the ring-shaped coils 41 and 42.

That is, the magnetic flux which is transmitted towards the ring-shaped coil 42 from the ring-shaped coils 35 and 36, is substantially absorbed by the short-circuiting ring 39 or 44 due to magnetic induction. Thus, the magnetic flux which is transmitted towards the ring-shaped coil 42, will be prevented from mixing into the magnetic flux (reproduced signal) which is transmitted from the ring-shaped coil 37 to the ring-shaped coil 42, as crosstalk.

Similarly, during the reproducing period of the head HC, the reproduced signal from the head HC is transmitted between the ring-shaped coils 36 and 41 which are located on the inner side of the short-circuiting rings 39 and 44. On the other hand, the signals which are reproduced from the adjacent tracks by the heads HD and HB and may mix into the reproduced signal from the head HC as crosstalk, are respectively transmitted between the ring-shaped coils 38 and 43 and between the ring-shaped coils 37 and 42 which are located on the outer side of the short-circuiting rings 39 and 44. Thus, the reproduced signals from the heads HD and HB will not mix into the reproduced signal from the head HC as crosstalk. Further, during the reproducing period of the head HD, the reproduced signals from the heads HA and HC which scan over the adjacent tracks will not mix into the reproduced signal from the head HD, because the transmission paths of the reproduced signal from the heads HA and HC, and the transmission path of the reproduced signal from the head HD, are located on the opposite sides with respect to the short-circuiting rings 39 and 44. Similarly, during the reproducing period of the head HA, the reproduced signals from the heads HB and HD which scan over the adjacent tracks will not mix into the reproduced signal from the head HA, because the transmission paths of the reproduced signal from the heads HB and HD, and the transmission path of the reproduced signal from the head HA, are located on the opposite sides with respect to the short-circuiting rings 39 and 44.

The reproduced signals from the heads HA through HD are successively switched so that the reproduced signal is obtained from the heads HA→HB→HC→HD-→HA→ . . . in this sequence, as described before. Hence, when selectively producing the reproduced signal from a certain head, the output of another head which opposes the certain head, that is, spaced 180° apart from the certain head, will not mix into the output of the certain head as crosstalk if the output of the other head is short-circuited by the switches $S_A$ through $S_D$. However, even if the outputs of the two heads which are spaced 90° apart from the certain head are short-circuited, the outputs of these two heads are easily mixed into the output of the certain head as crosstalk at the overlapping parts where the above switching of the reproduced signals is performed. But according to the present invention, such mixing of the reproduced signals from the adjacent tracks into the actual reproduced signal as crosstalk, is positively prevented by the provision of the short-circuiting rings 39 and 44.

It has been confirmed that the crosstalk is $-35$ dB between the heads HC and HB, $-35$ dB between the heads HA and HB, and also $-35$ dB between the heads HC and HD with respect to a signal having a frequency of 5 MHz. Thus, the crosstalk is exceedingly small.

The reproduced signal which is eliminated of the crosstalk in the above described manner, is passed through a corresponding preamplifier among the preamplifiers 68A through 68D, and then supplied to a switching circuit 72 or 73. The reproduced signals which are obtained through the preamplifiers 68A and 68B, are respectively supplied to terminals 72L and 72H of the switching circuit 72. The switching circuit 72 selectively passes one of the reproduced signals which are supplied to the terminals 72L and 72H, and supplies the passed reproduced signal to a terminal 74H of a switching circuit 74. On the other hand, the reproduced signals which are obtained through the preamplifiers 68C and 68D, are respectively supplied to terminals 73L and 73H of the switching circuit 73. This switching circuit 73 selectively passes one of the reproduced signals which are supplied to the terminals 73L and 73H, and supplies the passed reproduced signal to a terminal 74L of the switching circuit 74.

The switching circuits 72 and 73 are alternately controlled for every one field, by a first switching pulse which is generated from the switching pulse generating circuit 71. This switching pulse is a symmetrical square wave having a period which is approximately equal to 3/2 times one rotational period of the rotary upper drum 23. On the other hand, the switching circuit 74 is controlled by a second switching pulse which is generated from the switching pulse generating circuit 71, so as to selectively and alternately pass the reproduced signals which are supplied to the terminals 74H and 74L. The second switching pulse is a symmetrical square wave having a period which is approximately equal to three times one rotational period of the rotary upper drum 23, that is, four fields. As a result, the reproduced signals from the heads HA, HB, HC, and HD are switched for every one field, and produced through an output terminal 75.

Next, general description will be given with respect to another embodiment of a rotary transformer device according to the present invention, by referring to FIG. 10. In FIG. 10, those parts which are the same as those corresponding parts in FIG. 1 are designated by the same reference numerals, and their description will be omitted. In FIG. 10, the rotary transformer device comprises a cylinder-shaped rotary core 77 which is fixed to the bottom surface of the rotary body 11, a hollow cylinder-shaped stationary core 78, ring-shaped coils 79 through 82 which are embedded in four of five grooves excluding a center groove which are formed in the outer peripheral surface of the rotary core 77, a short-circuiting ring 83 which is embedded in the center groove of the rotary core 77, ring-shaped coils 84 through 87 which are embedded in four of five grooves excluding a center groove which are formed in the inner peripheral surface of the stationary core 78, and a short-circuiting ring 88 which is embedded in the center groove of the stationary core 78. The five grooves which are formed in the rotary core 77 respectively oppose the five grooves which are formed in the stationary core 78, and have the same diameter. The ring-shaped coils 79 through 82 in the rotary core 77, respectively oppose the ring-shaped coils 84 through 87 in the stationary core 78.

A slight gap is formed between the outer peripheral surface of the cylinder-shaped rotary core 77 and the inner peripheral surface of the hollow cylinder-shaped stationary core 78. Further, the stationary core 78 is designed so that the top part thereof will not make contact with the rotary body 11. The ring-shaped coils 79, 80, 81, and 82 are respectively coupled to the heads HA, HC, HB, and HD. On the other hand, the ring-shaped coils 84, 85, 86, and 87 are respectively coupled to elements such as recording amplifiers and preamplifiers, as in the case of the ring-shaped coils 40, 41, 42, and 43 described previously.

Accordingly, the signal transmission and reception is performed between the ring-shaped coils 79 through 82 of the rotary core 77 which rotates unitarily with the rotary body 11, and the ring-shaped coils 84 through 87 of the stationary core 78 which constantly remains stationary. According to this embodiment, the only difference from the previously described embodiment is that the signal transmission is performed horizontally to the rotational plane, while the signal transmission is performed perpendicularly to the rotational plane in the previously described embodiment. The mixing of crosstalk is positively prevented according to this embodiment by the provision of the short-circuiting rings 83 and 88, similarly as in the case of the previously described embodiment.

The rotational speed of the rotary body 11 is not limited to the rotational speed employed in the embodiment where the rotary body 11 undergoes a 270°-rotation for every one field period of the video signal which is to be recorded and reproduced. For example, the rotary body 11 may rotate at a rotational speed so that the rotary body 11 undergoes a 270°-rotation during a period which is 1/m times one field period of the video signal which is to be recorded and reproduced, where m

What is claimed is:

1. A combination of reproducing heads and a rotary transformer device, said reproducing heads being constituted by a first pair of mutually opposing heads each having a gap of a first azimuth angle and a second pair of mutually opposing heads each having a gap of a second azimuth angle, said first azimuth angle being different from said second azimuth angle, said first and second pairs of heads being mounted on a rotary body with an equi-angular separation of 90° between two adjacent heads, said rotary body being wrapped with a magnetic tape around a peripheral surface thereof over an angular range which is greater than 270° but less than 360° and rotating at a rotational speed of 270° per unit, said unit being 1/n times one field period of a video signal which is pre-recorded on said magnetic tape, where n is a natural number, three heads out of said first and second pairs of heads constantly making contact with said magnetic tape at one time while one of said three heads scans over a desired track which is pre-recorded with video signal by a head having a gap of the same azimuth angle as that of said one head, each of two remaining heads out of said three heads generating an undesired signal by scanning over a part of a track which is pre-recorded with the video signal by a head having a gap of the same azimuth angle as that of each of said two remaining heads and is adjacent to said desired track, said rotary transformer device comprising:

a rotary core rotating unitarily with said rotary body, said rotary core having five circular grooves arranged and formed in one surface thereof;

first through fourth ring-shaped coils embedded in four of said five grooves of said rotary core excluding a center groove which is located at an innermost position of said five grooves;

a first short-circuiting ring embedded in said center groove among said five grooves of said rotary core;

a stationary core located at a position opposing said one surface of said rotary core with a slight gap formed between said stationary core and said one surface of said rotary core, said stationary core being stationary and having five circular grooves arranged and formed in one surface thereof which opposes said one surface of said rotary core, said five grooves of said stationary core respectively opposing said five grooves of said rotary core;

fifth through eighth ring-shaped coils embedded in four of said five grooves of said stationary core excluding a center groove which is located at an innermost position of said five grooves, said fifth through eighth ring-shaped coils performing transmission and reception of signals between said first through fourth ring-shaped coils which are embedded in said rotary core; and a second short-circuiting ring embedded in said center groove among said five grooves of said stationary core, said second short-circuiting ring opposing said first short-circuiting ring, said first and second ring-shaped coils located on one side with respect to said first short-circuiting ring being coupled to said first pair of heads, said third and fourth ring-shaped coils located on a side opposite to said one side with respect to said first short-circuiting ring being coupled to said second pair of heads.

2. A combination of reproducing heads and a rotary transformer device as claimed in claim 1 in which said five grooves of said rotary core respectively have different diameters and are concentrically arranged and formed in a flat surface of said rotary core, said five grooves of said stationary core respectively have different diameters and are concentrically arranged and formed in a flat surface of said stationary core, and said flat surface of said stationary core opposes said flat surface of said rotary core.

3. A combination of reproducing heads and a rotary transformer device as claimed in claim 2 in which the winding numbers per unit length of said first through fourth ring-shaped coils and said fifth through eighth ring-shaped coils are selected, so that the winding numbers per unit length of two ring-shaped coils which are located on the inner side of said first and second short-circuiting rings are larger than the winding number per unit length of two ring-shaped coils which are located on the outer side of said first and second short-circuiting rings.

4. A combination of reproducing heads and a rotary transformer device as claimed in claim 1, in which said rotary core has a cylindrical surface, said five grooves of said rotary core are arranged and formed in said cylindrical surface of said rotary core at different height positions, said stationary core has a cylindrical surface which opposes said cylindrical surface of said rotary core, and said five grooves of said stationary core are arranged and formed on said cylindrical surface of said stationary core at different height positions.

5. A combination of reproducing heads and a rotary transformer device as claimed in claim 1 in which said first and second short-circuiting rings are respectively made from a conductive material and have a continuous configuration having no ends.

6. A combination of reproducing heads and a rotary transformer device as claimed in claim 1 in which said first through fourth ring-shaped coils and said fifth through eighth ring-shaped coils respectively have lead wires, said rotary core has a disc-shaped configuration and has a center hole, said stationary core has a disc-shaped configuration, the lead wires of said first through fourth ring-shaped coils are drawn out through the center hole in said rotary core, and the lead wires of said fifth through eighth ring-shaped coils are drawn out through an outer peripheral side of said stationary core.

* * * * *